US010469967B2

(12) United States Patent
Rossum et al.

(10) Patent No.: US 10,469,967 B2
(45) **Date of Patent: *Nov. 5, 2019**

(54) UTILIZING DIGITAL MICROPHONES FOR LOW POWER KEYWORD DETECTION AND NOISE SUPPRESSION

(71) Applicant: Knowles Electronics, LLC, Itasca, IL (US)

(72) Inventors: David P. Rossum, Santa Cruz, CA (US); Niel D. Warren, Soquel, CA (US)

(73) Assignee: Knowler Electronics, LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,105

(22) Filed: Jul. 23, 2018

(65) Prior Publication Data

US 2018/0332416 A1 Nov. 15, 2018

Related U.S. Application Data

(63) Continuation of application No. 14/989,445, filed on Jan. 6, 2016, now Pat. No. 10,045,140.

(Continued)

(51) Int. Cl.

| | |
|---|---|
| ***H04R 29/00*** | (2006.01) |
| *G10L 15/08* | (2006.01) |

(Continued)

(52) U.S. Cl.

CPC ........ *H04R 29/004* (2013.01); *G10L 21/0208* (2013.01); *G10L 2015/088* (2013.01);

(Continued)

(58) Field of Classification Search

CPC ............... H04R 3/005; H04R 2410/05; H04R 2410/01; H04R 29/004; G10L 21/0208; G10L 2015/088

(Continued)

(56) References Cited

U.S. PATENT DOCUMENTS

| | | | |
|---|---|---|---|
| 3,989,897 | A | 11/1976 | Carver |
| 4,811,404 | A | 3/1989 | Barlo et al. |

(Continued)

FOREIGN PATENT DOCUMENTS

| | | | |
|---|---|---|---|
| CN | 1083639 | A | 3/1994 |
| CN | 1306472 | A | 8/2001 |

(Continued)

OTHER PUBLICATIONS

Anonymous, "dsPIC30F Digital Signal Controllers," retrieved from http://ww1.microchip.com/downloads/en/DeviceDoc/dspbrochure_70095G.pdf (Oct. 31, 2004).

*Primary Examiner* — Paul Kim

(74) *Attorney, Agent, or Firm* — Foley & Lardner LLP

(57) ABSTRACT

Provided are systems and methods for utilizing digital microphones in low power keyword detection and noise suppression. An example method includes receiving a first acoustic signal representing at least one sound captured by a digital microphone. The first acoustic signal includes buffered data transmitted with a first clock frequency. The digital microphone may provide voice activity detection. The example method also includes receiving at least one second acoustic signal representing the at least one sound captured by a second microphone, the at least one second acoustic signal including real-time data. The first and second acoustic signals are provided to an audio processing system which may include noise suppression and keyword detection. The buffered portion may be sent with a higher, second clock frequency to eliminate a delay of the first acoustic (Continued)

signal from the second acoustic signal. Providing the signals may also include delaying the second acoustic signal.

20 Claims, 5 Drawing Sheets

Related U.S. Application Data

(60) Provisional application No. 62/100,758, filed on Jan. 7, 2015.

(51) Int. Cl.
*G10L 21/0208* (2013.01)
*H04R 3/00* (2006.01)

(52) U.S. Cl.
CPC .......... *H04R 3/005* (2013.01); *H04R 2410/01* (2013.01); *H04R 2410/05* (2013.01)

(58) Field of Classification Search
USPC .................................................... 381/97, 122
See application file for complete search history.

(56) References Cited

U.S. PATENT DOCUMENTS 4,812,996 A 3/1989 Stubbs
4,831,558 A 5/1989 Shoup et al.
5,012,519 A 4/1991 Shabtai et al.
5,335,312 A 8/1994 Mekata et al.
5,340,316 A 8/1994 Javkin
5,473,702 A 12/1995 Yoshida et al.
5,555,287 A 9/1996 Gulick et al.
5,675,808 A 10/1997 Gulick et al.
5,819,219 A 10/1998 De Vos et al.
5,822,598 A 10/1998 Lam
5,828,997 A 10/1998 Durlach et al.
5,886,656 A 3/1999 Feste et al.
6,057,791 A 5/2000 Knapp
6,070,140 A 5/2000 Tran
6,138,101 A 10/2000 Fujii
6,154,721 A 11/2000 Sonnic
6,249,757 B1 6/2001 Cason
6,259,291 B1 7/2001 Huang
6,381,570 B2 4/2002 Li et al.
6,397,186 B1 5/2002 Bush et al.
6,449,586 B1 9/2002 Hoshuyama
6,483,923 B1 11/2002 Marash
6,594,367 B1 7/2003 Marash et al.
6,756,700 B2 6/2004 Zeng
6,829,244 B1 12/2004 Wildfeuer et al.
6,876,859 B2 4/2005 Anderson et al.
7,102,452 B1 9/2006 Holmes
7,190,038 B2 3/2007 Dehe et al.
7,319,959 B1 1/2008 Watts
7,346,176 B1 3/2008 Bernardi et al.
7,373,293 B2 5/2008 Chang et al.
7,415,416 B2 8/2008 Rees
7,473,572 B2 1/2009 Dehe et al.
7,539,273 B2 5/2009 Struckman
7,546,498 B1 6/2009 Tang et al.
7,619,551 B1 11/2009 Wu
7,630,504 B2 12/2009 Poulsen
7,774,204 B2 8/2010 Mozer et al.
7,781,249 B2 8/2010 Laming et al.
7,795,695 B2 9/2010 Weigold et al.
7,825,484 B2 11/2010 Martin et al.
7,829,961 B2 11/2010 Hsiao
7,856,283 B2 12/2010 Burk et al.
7,856,804 B2 12/2010 Laming et al.
7,873,114 B2 1/2011 Lin
7,903,831 B2 3/2011 Song
7,957,542 B2 6/2011 Sarrukh et al.
7,957,972 B2 6/2011 Huang et al.
7,986,794 B2 7/2011 Zhang
8,005,238 B2 8/2011 Tashev
8,111,843 B2 2/2012 Logalbo
8,112,272 B2 2/2012 Nagahama
8,155,346 B2 4/2012 Yoshizawa
8,184,822 B2 5/2012 Carreras
8,184,823 B2 5/2012 Itabashi
8,204,253 B1 6/2012 Solbach
8,274,856 B2 9/2012 Byeon
8,275,148 B2 9/2012 Li et al.
8,447,045 B1 5/2013 Laroche
8,538,035 B2 9/2013 Every et al.
8,606,571 B1 12/2013 Every et al.
8,666,751 B2 3/2014 Murthi et al.
8,712,776 B2 4/2014 Bellegarda
8,958,572 B1 2/2015 Solbach
8,972,252 B2 3/2015 Hung et al.
8,996,381 B2 3/2015 Mozer et al.
9,043,211 B2 5/2015 Haiut et al.
9,111,548 B2 8/2015 Nandy et al.
9,112,984 B2 8/2015 Sejnoha et al.
2002/0106092 A1 8/2002 Matsuo
2002/0123456 A1 9/2002 Glass
2002/0138265 A1 9/2002 Stevens
2003/0138061 A1 7/2003 Li
2003/0171907 A1 9/2003 Gal-On et al.
2005/0060155 A1 3/2005 Chu
2005/0171851 A1 8/2005 Applebaum
2005/0207605 A1 9/2005 Dehe et al.
2006/0013415 A1 1/2006 Winchester
2006/0074658 A1 4/2006 Chadha
2006/0074693 A1 4/2006 Yamashita
2006/0164151 A1 7/2006 Chatterjee et al.
2007/0053522 A1 3/2007 Murray
2007/0076896 A1 4/2007 Hosaka
2007/0088544 A1 4/2007 Acero et al.
2007/0127761 A1 6/2007 Poulsen
2007/0154031 A1 7/2007 Avendano et al.
2007/0253574 A1 11/2007 Arthur
2007/0274297 A1 11/2007 Cross et al.
2007/0278501 A1 12/2007 Macpherson et al.
2008/0019548 A1 1/2008 Avendano
2008/0147397 A1 6/2008 Konig
2008/0170716 A1 7/2008 Zhang
2008/0175425 A1 7/2008 Roberts et al.
2008/0195389 A1 8/2008 Zhang
2008/0232607 A1 9/2008 Tashev
2008/0260175 A1 10/2008 Elko
2008/0267431 A1 10/2008 Leidl et al.
2008/0279407 A1 11/2008 Pahl
2008/0283942 A1 11/2008 Huang et al.
2009/0001553 A1 1/2009 Pahl et al.
2009/0003629 A1 1/2009 Shajaan et al.
2009/0012783 A1 1/2009 Klein
2009/0012786 A1 1/2009 Zhang
2009/0022335 A1 1/2009 Konchitsky
2009/0024392 A1 1/2009 Koshinaka
2009/0055170 A1 2/2009 Nagahama
2009/0067642 A1 3/2009 Buck
2009/0146848 A1 6/2009 Ghassabian
2009/0164212 A1 6/2009 Chan
2009/0175466 A1 7/2009 Elko
2009/0180655 A1 7/2009 Tien et al.
2009/0234645 A1 9/2009 Bruhn
2009/0257289 A1 10/2009 Byeon
2009/0304203 A1 12/2009 Haykin
2009/0316935 A1 12/2009 Furst et al.
2009/0323982 A1 12/2009 Solbach et al.
2010/0046780 A1 2/2010 Song
2010/0052082 A1 3/2010 Lee et al.
2010/0082346 A1 4/2010 Rogers
2010/0082349 A1 4/2010 Bellegarda
2010/0121629 A1 5/2010 Cohen
2010/0128914 A1 5/2010 Khenkin
2010/0135508 A1 6/2010 Wu
2010/0183181 A1 7/2010 Wang
2010/0246877 A1 9/2010 Wang et al.
2010/0290644 A1 11/2010 Wu et al.
2010/0322443 A1 12/2010 Wu et al.
2010/0322451 A1 12/2010 Wu et al.

(56) References Cited

U.S. PATENT DOCUMENTS

| | | | |
|---|---|---|---|
| 2010/0324894 A1 | 12/2010 | Potkonjak | |
| 2011/0013787 A1 | 1/2011 | Chang | |
| 2011/0026739 A1* | 2/2011 | Thomsen | H03F 1/3211 381/120 |
| 2011/0038489 A1 | 2/2011 | Visser | |
| 2011/0064242 A1 | 3/2011 | Parikh et al. | |
| 2011/0075875 A1 | 3/2011 | Wu et al. | |
| 2011/0099010 A1 | 4/2011 | Zhang | |
| 2011/0103626 A1 | 5/2011 | Bisgaard | |
| 2011/0107010 A1 | 5/2011 | Strauss et al. | |
| 2011/0164761 A1 | 7/2011 | Iain | |
| 2011/0170714 A1 | 7/2011 | Hanzlik et al. | |
| 2011/0218805 A1 | 9/2011 | Washio | |
| 2011/0274291 A1 | 11/2011 | Tashev | |
| 2011/0293115 A1 | 12/2011 | Henriksen | |
| 2011/0299695 A1 | 12/2011 | Nicholson | |
| 2012/0027218 A1 | 2/2012 | Every et al. | |
| 2012/0112804 A1 | 5/2012 | Li et al. | |
| 2012/0113899 A1 | 5/2012 | Overmars | |
| 2012/0177227 A1 | 7/2012 | Adachi | |
| 2012/0232896 A1 | 9/2012 | Taleb et al. | |
| 2012/0250910 A1 | 10/2012 | Shajaan et al. | |
| 2012/0310641 A1 | 12/2012 | Niemisto et al. | |
| 2013/0035777 A1 | 2/2013 | Niemisto et al. | |
| 2013/0058495 A1 | 3/2013 | Furst et al. | |
| 2013/0195291 A1 | 8/2013 | Josefsson | |
| 2013/0197920 A1 | 8/2013 | Lesso et al. | |
| 2013/0223635 A1 | 8/2013 | Singer et al. | |
| 2013/0289988 A1 | 10/2013 | Fry | |
| 2013/0289996 A1 | 10/2013 | Fry | |
| 2013/0322461 A1 | 12/2013 | Poulsen | |
| 2014/0163978 A1 | 6/2014 | Basye et al. | |
| 2014/0244269 A1 | 8/2014 | Tokutake | |
| 2014/0244273 A1 | 8/2014 | Laroche et al. | |
| 2014/0257821 A1 | 9/2014 | Adams et al. | |
| 2014/0270260 A1 | 9/2014 | Goertz et al. | |
| 2014/0274203 A1 | 9/2014 | Ganong et al. | |
| 2014/0278435 A1 | 9/2014 | Ganong et al. | |
| 2014/0281628 A1 | 9/2014 | Nigam et al. | |
| 2014/0316783 A1 | 10/2014 | Medina | |
| 2014/0343949 A1 | 11/2014 | Huang et al. | |
| 2015/0030163 A1 | 1/2015 | Sokolov | |
| 2015/0106085 A1 | 4/2015 | Lindahl | |
| 2015/0112690 A1 | 4/2015 | Guha et al. | |
| 2015/0134331 A1 | 5/2015 | Millet et al. | |

FOREIGN PATENT DOCUMENTS

| | | | |
|---|---|---|---|
| CN | 1868118 | A | 11/2006 |
| CN | 101288337 | A | 10/2008 |
| CN | 102224675 | | 10/2011 |
| CN | 1022224675.5 | A | 10/2011 |
| CN | 102272826 | A | 12/2011 |
| CN | 102568480 | A | 7/2012 |
| CN | 102770909 | A | 11/2012 |
| CN | 102983868 | A | 3/2013 |
| CN | 103117065 | A | 5/2013 |
| WO | WO-90/13890 | A1 | 11/1990 |
| WO | WO-02/03747 | A2 | 1/2002 |
| WO | WO-02/061727 | | 8/2002 |
| WO | WO-2005/009072 | A2 | 1/2005 |
| WO | WO-2007/009465 | A2 | 1/2007 |
| WO | WO-2010/060892 | A1 | 6/2010 |

* cited by examiner

UTILIZING DIGITAL MICROPHONES FOR LOW POWER KEYWORD DETECTION AND NOISE SUPPRESSION

CROSS-REFERENCE TO RELATED APPLICATION

This application is a continuation of U.S. patent application Ser. No. 14/989,445, filed Jan. 6, 2016, which claims the benefit of and priority to U.S. Provisional Patent Application No. 62/100,758, filed Jan. 7, 2015, the entire contents of both of which are incorporated herein by reference.

FIELD

The present application relates generally to audio processing and, more specifically, to systems and methods for utilizing digital microphones for low power keyword detection and noise suppression.

BACKGROUND

A typical method of keyword detection is a three stage process. The first stage is vocalization detection. Initially, an extremely low power "always-on" implementation continuously monitors ambient sound and determines whether a person begins to utter a possible keyword (typically by detecting human vocalization). When a possible keyword vocalization is detected, the second stage begins.

The second stage performs keyword recognition. This operation consumes more power because it is computationally more intensive than the vocalization detection. When the examination of an utterance (e.g., keyword recognition) is complete, the result can either be a keyword match (in which case the third stage will be entered) or no match (in which case operation of the first, lowest power stage resumes).

The third stage is used for analysis of any speech subsequent to the keyword recognition using automatic speech recognition (ASR). This third stage is a very computationally intensive process and, therefore, can greatly benefit from improvements to the signal to noise ratio (SNR) of the portion of the audio that includes the speech. The SNR is typically optimized using noise suppression (NS) signal processing, which may require obtaining audio input from multiple microphones.

Use of a digital microphone (DMIC) is well known. The DMIC typically includes a signal processing portion. A digital signal processor (DSP) is typically used to perform computations for detecting keywords. Having some form of digital signal processor (DSP), to perform the keyword detection computations, on the same integrated circuit (chip) as the signal processing portion of the DMIC itself may have system power benefits. For example, while in the first stage, the DMIC can operate from an internal oscillator, thus saving the power of supplying an external clock to the DMIC and the power of transmitting the DMIC data output, typically, a pulse density modulated (PDM) signal, to an external DSP device.

It is also known that implementing the subsequent stages of keyword recognition on the DMIC may not be optimal for the lowest power or system cost. The subsequent stages of keyword recognition are computationally intensive and, thus, consume significant dynamic power and die area. However, the DMIC signal processing chip is typically implemented using a process geometry having significantly higher dynamic power and larger area per gate or memory bit than the best available digital processes.

Finding an optimal implementation that takes advantage of the potential power savings of implementing the first stage of keyword recognition in the DMIC can be challenging due to conflicting requirements. To optimize power, the DMIC operates in an "always-on," standalone manner, without transmitting audio data to an external device when no vocalization has been detected. When the vocalization is detected, the DMIC needs to provide a signal to an external device indicating this condition. Simultaneously with or subsequent to the occurrence of this condition, the DMIC needs to begin providing audio data to the external device(s) performing the subsequent stages. Optimally, the audio data interface is needed to meet the following requirements: transmitting audio data corresponding to times that significantly precede the vocalization detection, transmitting real-time audio data at an externally provided clock (sample) rate, and simplifying multi-microphone noise suppression processing. Additionally, latency associated with the real-time audio data for DMICs that implement the first stage of keyword recognition needs to be substantially the same as for conventional DMICs, the interface needs to be compatible with existing interfaces, the interface needs to indicate the clock (sample) rate used while operating with the internal oscillator, and no audio drop-outs should occur.

An interface with a DMIC that implement the first stage of keyword recognition can be challenging to implement largely due to the requirement to present audio data that is buffered significantly prior to the vocalization detection. This buffered audio data was previously acquired at a sample rate determined by the internal oscillator. Consequently, when the buffered audio data is provided along with real-time audio data as part of a single, contiguous audio stream, it can be difficult to make this real-time audio data have the same latency as in a conventional DMIC or difficult to use conventional multi-microphone noise suppression techniques.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Systems and methods for utilizing digital microphones for low power keyword detection and noise suppression are provided. An example method includes receiving a first acoustic signal representing at least one sound captured by a digital microphone, the first acoustic signal including buffered data transmitted on a single channel with a first clock frequency. The example method also includes receiving at least one second acoustic signal representing the at least one sound captured by at least one second microphone. The at least one second acoustic signal may include real-time data. In some embodiments, the at least one second microphone may be an analog microphone. The at least one second microphone may also be a digital microphone that does not have voice activity detection functionality.

The example method further includes providing the first acoustic signal and the at least one second acoustic signal to an audio processing system. The audio processing system may provide at least noise suppression.

In some embodiments, the buffered data is sent with a second clock frequency higher than the first clock frequency, to eliminate a delay of the first acoustic signal from the second acoustic signal.

Providing the signals may include delaying the second acoustic signal.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The present disclosure provides example systems and methods for utilizing digital microphones for low power keyword detection and noise suppression. Various embodiments of the present technology can be practiced with mobile audio devices configured at least to capture audio signals and may allow improving automatic speech recognition in the captured audio.

In various embodiments, mobile devices are hand-held devices, such as, notebook computers, tablet computers, phablets, smart phones, personal digital assistants, media players, mobile telephones, video cameras, and the like. The mobile devices may be used in stationary and portable environments. The stationary environments can include residential and commercial buildings or structures and the like. For example, the stationary environments can further include living rooms, bedrooms, home theaters, conference rooms, auditoriums, business premises, and the like. Portable environments can include moving vehicles, moving persons, other transportation means, and the like.

Figure 1:
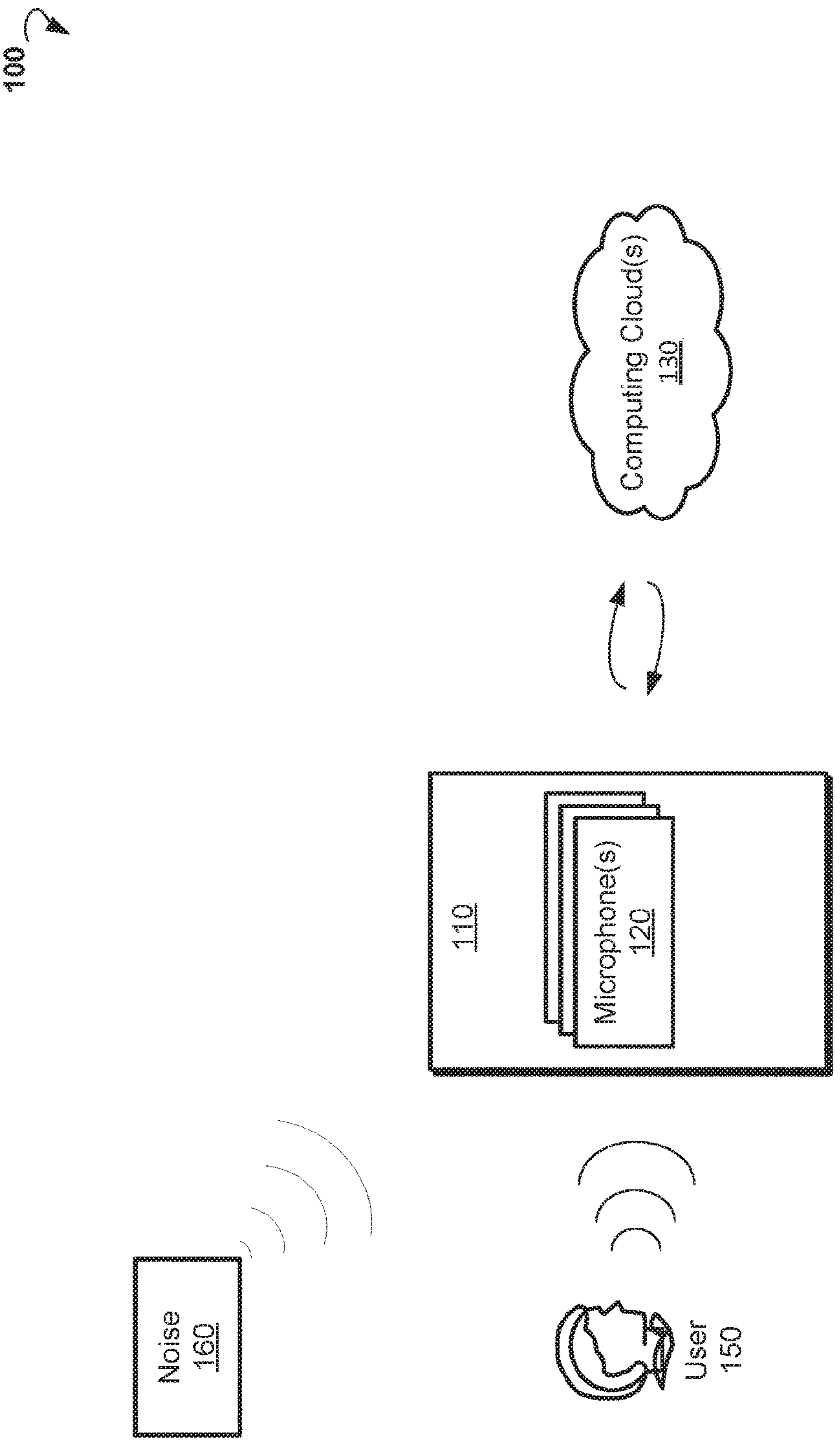
FIG. 1 is a block diagram illustrating a system, which can be used to implement methods for utilizing digital microphones for low power keyword detection and noise suppression, according to various example embodiments.

Referring now to FIG. 1, an example system 100 in which methods of the present disclosure can be practiced is shown. The system 100 can include a mobile device 110. In various embodiments, the mobile device 110 includes microphone(s) (e.g., transducer(s)) 120 configured to receive voice input/acoustic signal from a user 150.

The voice input/acoustic sound can be contaminated by a noise 160. Noise sources can include street noise, ambient noise, speech from entities other than an intended speaker(s), and the like. For example, noise sources can include a working air conditioner, ventilation fans, TV sets, mobile phones, stereo audio systems, and the like. Certain kinds of noise may arise from both operation of machines (for example, cars) and the environments in which they operate, for example, a road, track, tire, wheel, fan, wiper blade, engine, exhaust, entertainment system, wind, rain, waves, and the like noises.

In some embodiments, the mobile device 110 is communicatively connected to one or more cloud-based computing resources 130, also referred to as a computing cloud(s) 130 or a cloud 130. The cloud-based computing resource(s) 130 can include computing resources (hardware and software) available at a remote location and accessible over a network (for example, the Internet or a cellular phone network). In various embodiments, the cloud-based computing resource(s) 130 are shared by multiple users and can be dynamically re-allocated based on demand. The cloud-based computing resource(s) 130 can include one or more server farms/clusters, including a collection of computer servers which can be co-located with network switches and/or routers.

Figure 2:
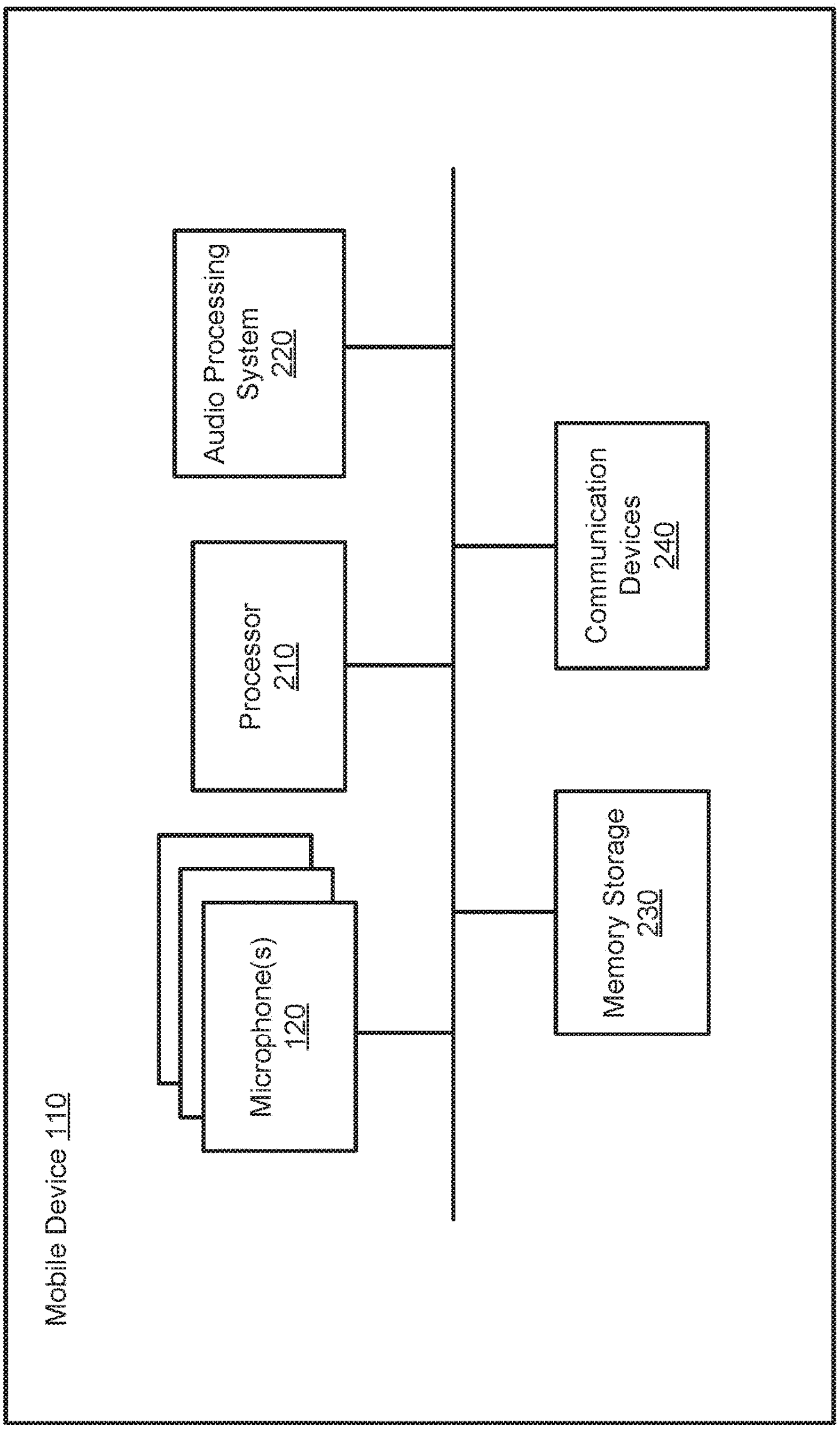
FIG. 2 is a block diagram of an example mobile device, in which methods for utilizing digital microphones for low power keyword detection and noise suppression can be practiced.

FIG. 2 is a block diagram showing components of the mobile device 110, according to various example embodiments. In the illustrated embodiment, the mobile device 110 includes one or more microphone(s) 120, a processor 210, audio processing system 220, a memory storage 230, and one or more communication devices 240. In certain embodiments, the mobile device 110 also includes additional or other components necessary for operations of mobile device 110. In other embodiments, the mobile device 110 includes fewer components that perform similar or equivalent functions to those described with reference to FIG. 2.

In various embodiments, where the microphone(s) 120 include multiple omnidirectional microphones closely spaced (e.g., 1-2 em apart), a beam-forming technique can be used to simulate a forward-facing and a backward-facing directional microphone response. In some embodiments, a level difference can be obtained using the simulated forward-facing and the backward-facing directional microphones. The level difference can be used to discriminate between speech and noise in, for example, the time-frequency domain, which can be further used in noise and/or echo reduction. Noise reduction may include noise cancellation and/or noise suppression. In certain embodiments, some microphone(s) 120 are used mainly to detect speech and other microphones are used mainly to detect noise. In yet other embodiments, some microphones are used to detect both noise and speech.

In some embodiments, the acoustic signals, once received, for example, captured by microphone(s) 120, are converted into electric signals, which, in turn, are converted, by the audio processing system 220, into digital signals for processing in accordance with some embodiments. The processed signals may be transmitted for further processing to the processor 210. In some embodiments, some of the microphones 120 are digital microphone(s) operable to capture the acoustic signal and output a digital signal. Some of the digital microphone(s) may provide for voice activity detection (also referred to herein as vocalization detection) and buffering of the audio data significantly prior to the vocalization detection.

Audio processing system 220 can be operable to process an audio signal. In some embodiments, the acoustic signal is captured by the microphone(s) 120. In certain embodiments, acoustic signals detected by the microphone(s) 120 are used by audio processing system 220 to separate desired speech (for example, keywords) from the noise, providing more robust automatic speech recognition (ASR).

An example audio processing system suitable for performing noise suppression is discussed in more detail in U.S.

patent application Ser. No. 12/832,901 (now U.S. Pat. No. 8,473,287), entitled "Method for Jointly Optimizing Noise Reduction and Voice Quality in a Mono or Multi-Microphone System," filed Jul. 8, 2010, the disclosure of which is incorporated herein by reference for all purposes. By way of example and not limitation, noise suppression methods are described in U.S. patent application Ser. No. 12/215,980 (now U.S. Pat. No. 9,185,487), entitled "System and Method for Providing Noise Suppression Utilizing Null Processing Noise Subtraction," filed Jun. 30, 2008, and in U.S. patent application Ser. No. 11/699,732 (now U.S. Pat. No. 8,194,880), entitled "System and Method for Utilizing Omni-Directional Microphones for Speech Enhancement," filed Jan. 29, 2007, which are incorporated herein by reference in their entireties.

Various methods for restoration of noise reduced speech are also described in commonly assigned U.S. patent application Ser. No. 13/751,907 (now U.S. Pat. No. 8,615,394), entitled "Restoration of Noise-Reduced Speech," filed Jan. 28, 2013, which is incorporated herein by reference in its entirety.

The processor 210 may include hardware and/or software operable to execute computer programs stored in the memory storage 230. The processor 210 can use floating point operations, complex operations, and other operations needed for implementations of embodiments of the present disclosure. In some embodiments, the processor 210 of the mobile device 110 includes, for example, at least one of a digital signal processor (DSP), image processor, audio processor, general-purpose processor, and the like.

The example mobile device 110 is operable, in various embodiments, to communicate over one or more wired or wireless communications networks, for example, via communication devices 240. In some embodiments, the mobile device 110 sends at least audio signal (speech) over a wired or wireless communications network. In certain embodiments, the mobile device 110 encapsulates and/or encodes the at least one digital signal for transmission over a wireless network (e.g., a cellular network).

The digital signal can be encapsulated over Internet Protocol Suite (TCP/IP) and/or User Datagram Protocol (UDP). The wired and/or wireless communications networks can be circuit switched and/or packet switched. In various embodiments, the wired communications network(s) provide communication and data exchange between computer systems, software applications, and users, and include any number of network adapters, repeaters, hubs, switches, bridges, routers, and firewalls. The wireless communications network(s) include any number of wireless access points, base stations, repeaters, and the like. The wired and/or wireless communications networks may conform to an industry standard(s), be proprietary, and combinations thereof. Various other suitable wired and/or wireless communications networks, other protocols, and combinations thereof, can be used.

Figure 3:
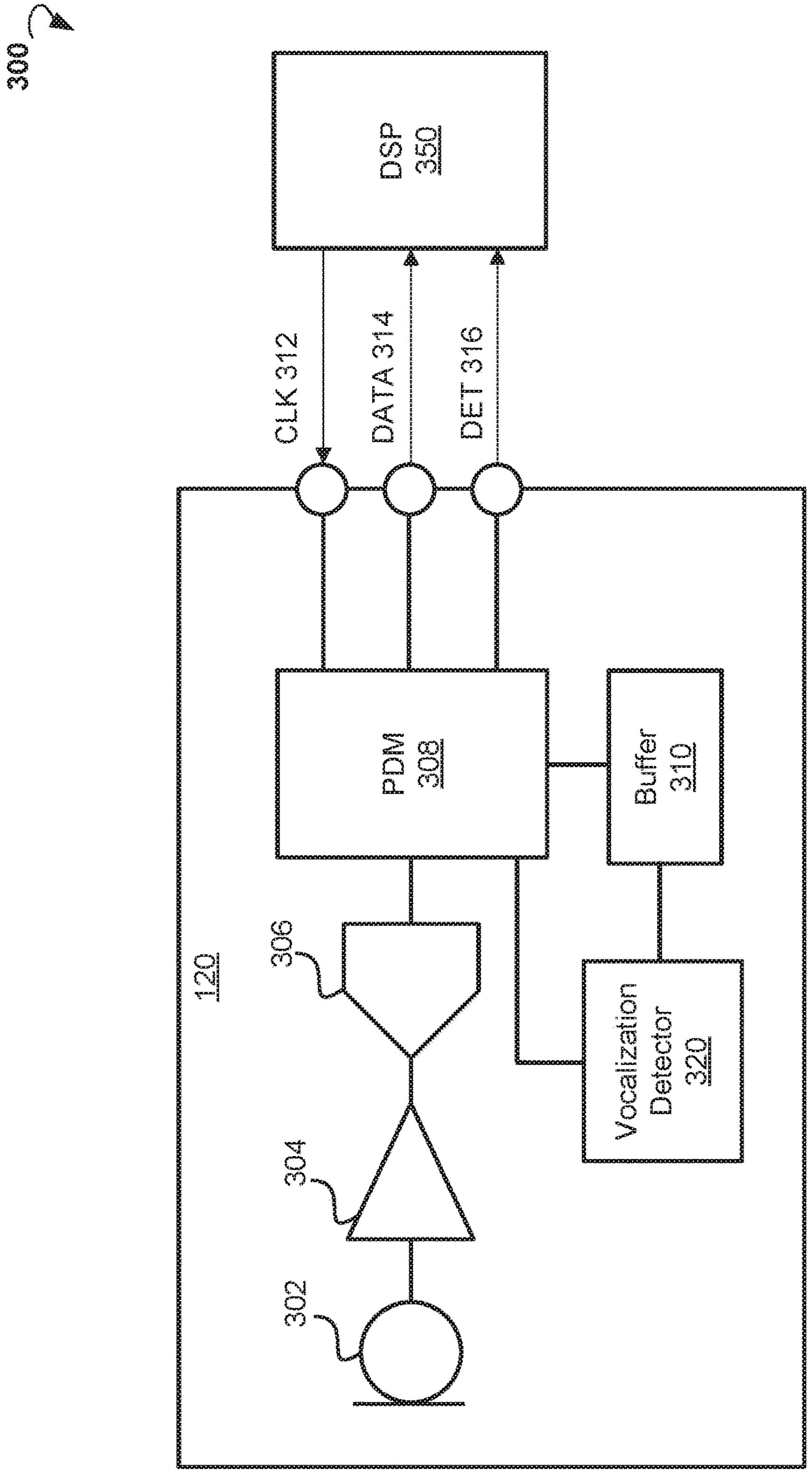
FIG. 3 is a block diagram showing a system for utilizing digital microphones for low power keyword detection and noise suppression, according to various example embodiments.

FIG. 3 is a block diagram showing a system 300 suitable for utilizing digital microphones for low power keyword detection and noise suppression, according to various example embodiments. The system 300 includes microphone(s) (also variously referred to herein as DMIC(s)) 120 coupled to a (external or host) DSP 350. In some embodiments, the digital microphone 120 includes a transducer 302, an amplifier 304, an analog-to-digital converter 306, and a pulse-density modulator (PDM) 308. In certain embodiments, the digital microphone 120 includes a buffer 310 and a vocalization detector 320. In other embodiments, the DMIC 120 interfaces with a conventional stereo DMIC interface. The conventional stereo DMIC interface includes a clock (CLK) input (or CLK line) 312 and a data (DATA) output 314. The data output includes a left channel and a right channel. In some embodiments, the DMIC interface includes an additional vocalization detector (DET) output (or DET line) 316. The CLK input 312 can be supplied by DSP 350. The DSP 350 can receive the DATA output 314 and DET output 316. In some embodiments, digital microphone 120 produces a real-time digital audio data stream, typically via PDM 308. An example digital microphone the provides vocalization detection is discussed in more detail in U.S. patent application Ser. No. 14/797,310, entitled "Microphone Apparatus and Method with Catch-up Buffer," filed Jul. 13, 2015, the disclosure of which is incorporated herein by reference for all purposes.

Example 1

In various embodiments, under first stage conditions, the DMIC 120 operates on an internal oscillator, which determines the internal sample rate during this condition. Under first stage conditions, prior to the vocalization detection, the CLK line 312 is static, typically, a logical 0. The DMIC 120 outputs a static signal, typically, a logical 0, on both the DATA output 314 and DET output 316. Internally, the DMIC 120 operating from its internal oscillator, can be operable to analyze the audio data to determine whether a vocalization has occurred. Internally, the DMIC 120 buffers the audio data into a recirculating memory (for example, using buffer 310). In certain embodiments, the recirculating memory has a pre-determined number (typically about 100 k of PDM) of samples.

In various exemplary embodiments, when the DMIC 120 detects a vocalization, the DMIC 120 begins outputting PDM 308 sample clock, derived from the internal oscillator, on the DET output 316. The DSP 350 can be operable to detect the activity on the DET line 316. The DSP 350 can use this signal to determine the internal sample rate of the DMIC 120 with a sufficient accuracy for further operations. Then the DSP 350 can output a clock on the CLK line 312 appropriate for receiving real-time PDM 308 audio data from the DMIC 120 via the conventional DMIC 120 interface protocol. In some embodiments, the clock is at the same rate as the clock of other DMICs used for noise suppression.

In some embodiments, the DMIC 120 responds to the presence of the CLK input 312 by immediately switching from the internal sample rate to the sample rate of the provided CLK line 312. In certain embodiments, the DMIC 120 is operable to immediately begin supplying real-time PDM 308 data on a first channel (for example, the left channel) of the DATA output 314, and the delayed (typically about 100 k PDM samples) buffered PDM 308 data on the second (for example, right) channel. The DMIC 110 can cease providing the internal clock on the DET signal when the CLK is received.

In some embodiments, after the entire (typically about 100 k sample) buffer has been transmitted, the DMIC 120 switches to sending the real-time audio data or a static signal (typically a logical 0) on the second (in the example, right) channel of DATA output 314 in order to save power.

In various embodiments, the DSP 350 accumulates the buffered data and then uses the ratio of the previously measured DMIC 120 internal sample rate to the host CLK sample rate as required to process the buffered data in a manner matching the buffered data to the real-time audio data. For example, the DSP 350 can convert the buffered data to the same rate as the host CLK sample rate. It should be appreciated by those skilled in the art that the actual sample rate conversion may not be optimal. Instead, further downstream frequency domain processing information can be biased in frequency based on the measured ratio. The buffered data may be pre-pended to the real-time audio data for the purposes of keyword recognition. It may also be pre-pended to data used for the ASR as desired.

In various embodiments, because the real-time audio data is not delayed, the real-time data has a low latency and can be combined with the real-time audio data from other microphones for noise suppression or other purposes.

Returning the CLK signal to a static state may be used to return the DMIC 120 to the first stage processing state.

Example 2

Under first stage conditions, the DMIC 120 operates on an internal oscillator, which determines the PDM 308 sample rate. In some exemplary embodiments, under first stage conditions, prior to vocalization detection, the CLK input 312 is static, typically, a logical 0. The DMIC 120 can output a static signal, typically a logical 0, on both the DATA output 314 and DET output 316. Internally, the DMIC 120 operating from its internal oscillator, is operable to analyze the audio data to determine if a vocalization occurs and also to internally buffer the audio data into a recirculating memory. The recirculating memory can have a pre-determined number (typically about 100 k of PDM) of samples.

In some embodiments, when the DMIC 120 detects vocalization, the DMIC begins outputting a PDM sample rate clock derived from its internal oscillator, on the DET output 316. The DSP 350 can detect the activity on the DET line 312. The DSP 350 then can use the DET output to determine the internal sample rate of the DMIC 120 with a sufficient accuracy for further operations. Then, the DSP 350 outputs a clock on the CLK line 312. In certain embodiments, the clock is at a higher rate than the internal oscillator sample rate, and appropriate to receive real-time PDM 308 audio data from the DMIC 120 via the conventional DMIC 120 interface protocol. In some embodiments, the clock provided to CLK line 312 is at the same rate as the clock for other DMICs used for noise suppression.

In some embodiments, the DMIC 120 responds to the presence of the clock at CLK line 312 by immediately beginning to supply buffered PDM 308 data on a first channel (for example, the left channel) of the DATA output 314. Because the CLK frequency is greater than the internal sampling frequency, the delay of the data gradually decreases from the buffer length to zero. When the delay reaches zero, the DMIC 120 responds by immediately switching its sample rate from internal oscillator's sample rate to the rate provided by the CLK line 312. The DMIC 120 can also immediately begin supplying real-time PDM 308 data on one of channels of the DATA output 314. The DMIC 120 also ceases providing the internal clock on the DET output 316 signal at this point.

In some embodiments, the DSP 350 can accumulate the buffered data and determine, based on sensing when the DET output 316 signal ceases, a point at which the DATA has switched from buffered data to real-time audio data. The DSP 350 can then use the ratio of the previously measured DMIC 120 internal sample rate to the CLK sample rate to logically sample rate of conversion of the buffered data to match that of the real-time audio data.

In this example, once the buffer data is completely received and the switch to real-time audio has occurred, the real-time audio data will have a low latency and can be combined with the real-time audio data from other microphones for noise suppression or other purposes.

Various embodiments illustrated by Example 2 may have a disadvantage, compared with some other embodiments, of a longer time from the vocalization detection to real-time operation, which requires a higher rate during the real-time operation than the rate of the stage one operations, and may also require accurate detection of the time of transition between the buffered and real-time audio data.

On the other hand, the various embodiments according to Example 2 have the advantage of only requiring the use of one channel of the stereo conventional DMIC 120 interface, leaving the other channel available for use by a second DMIC 120.

Example 3

Under the first stage conditions, the DMIC 120 can operate on an internal oscillator, which determines the PDM 308 sample rate. Under the first stage conditions, prior to the vocalization detection, the CLK input 312 is static, typically at a logical 0. The DMIC 120 outputs a static signal, typically a logical 0, on both the DATA output 314 and DET output 316. Internally, the DMIC 120, operating from the internal oscillator, is operable to analyze the audio data to determine if a vocalization occurs, and also by internally buffering that data into a recirculating memory (for example, the buffer 310) having a pre-determined number (typically about 100 k of PDM) samples.

When the DMIC 120 detects a vocalization, the DMIC 120 begins to output PDM 308 sample rate clock, derived from its internal oscillator, on the DET output 316. The DSP 350 can detect the activity on the DET output 316. The DSP 350 then can use the DET output 316 signal to determine the internal sample rate of the DMIC 120 with a sufficient accuracy for further operations. Then, the host DSP 350 may output a clock on the CLK line 312 appropriate to receiving real-time PDM 308 audio data from the DMIC 120 via the conventional DMIC 120 interface protocol. This clock may be at the same rate as the clock for other DMICs used for noise suppression.

In some embodiments, the DMIC 120 responds to the presence of the CLK input 312 by immediately beginning to supply buffered PDM 308 data on a first channel (for example, the left channel) of the DATA output 314. The DMIC 120 also ceases providing the internal clock on the DET output 316 signal at this point. When the buffer 310 of the data is exhausted, the DMIC 120 begins supplying real-time PDM 308 data on the one of the channels of the DATA output 314.

The DSP 350 accumulates the buffered data, noting, based on counting the number of samples received, a point at which the DATA has switched from buffered data to real-time audio data. The DSP 350 then uses the ratio of the previously measured DMIC 120 internal sample rate to the CLK sample rate to logically sample rate conversion of the buffered data to match that of the real-time audio data.

In some embodiments, even after the buffer data is completely received and the switch to real-time audio has occurred, the DMIC 120 data remains at a high latency. In some embodiments, the latency is equal to the buffer size in samples times the sample rate of CLK line 312. Because other microphones have low latency, the other microphone cannot be used with this data for conventional noise suppression.

In some embodiments, the mismatch between signals from microphones is eliminated by adding a delay to each of the other microphones used for noise suppression. After delaying, the streams from the DMIC 120 and the other microphones can be combined for noise suppression or other purposes. The delay added to the other microphones can either be determined based on known delay characteristics (e.g., latency due to buffering, etc.) of the DMIC 120 or can be measured algorithmically, e.g., based on comparing audio data received from the DMIC 120 and from the other microphones, for example, comparing timing, sampling rate clocks, etc.

Various embodiments of Example 3 have the disadvantage, compared with the preferred embodiment of Example 1, of a longer time from vocalization detection to real-time operation, and of having significant additional latency when operating in real-time. The embodiments of Example 3 have the advantage of only requiring the use of one channel of the stereo conventional DMIC interface, leaving the other channel available for use by a second DMIC.

Figure 4:
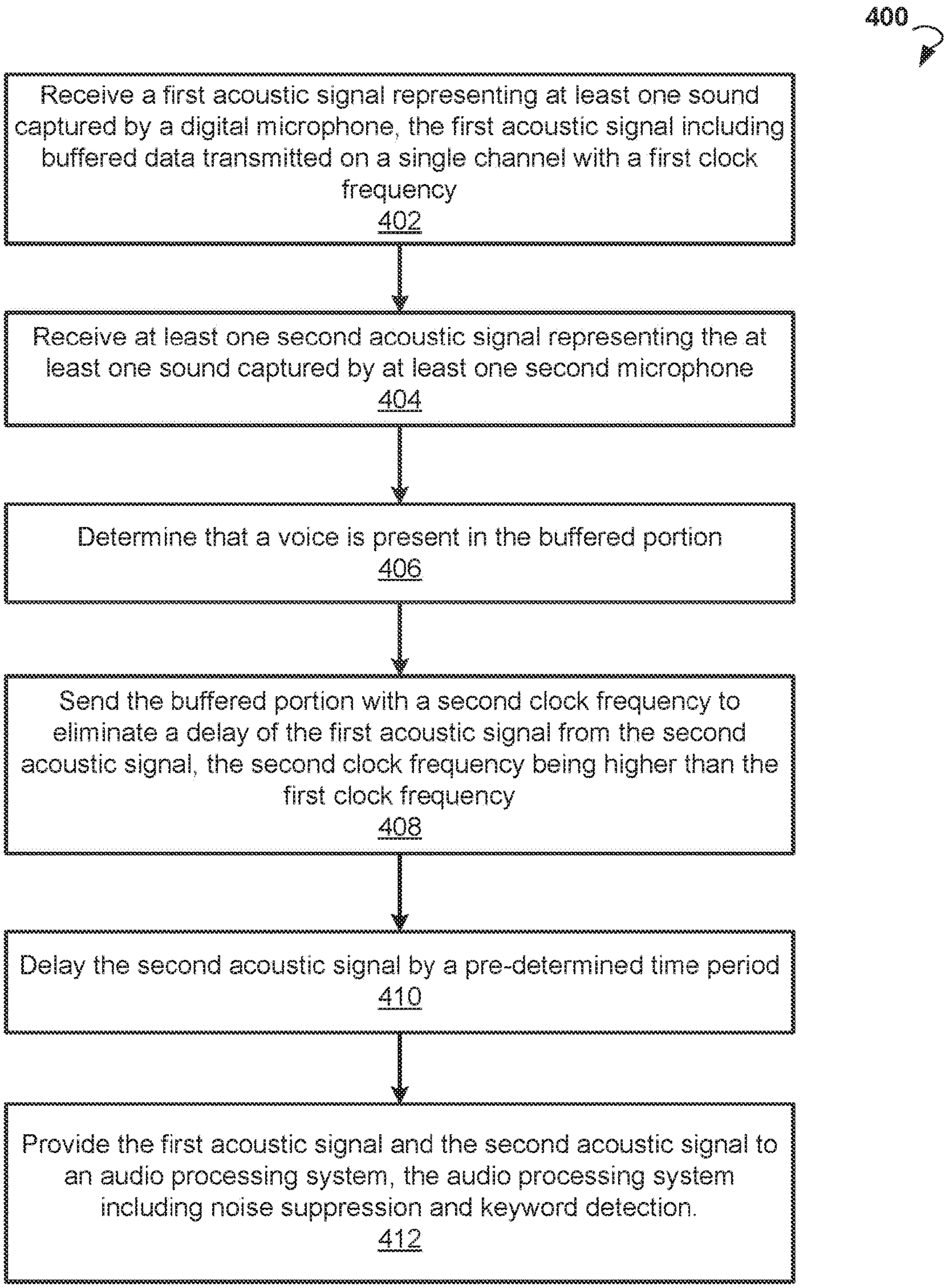
FIG. 4 is a flow chart showing steps of a method for utilizing digital microphones for low power keyword detection and noise suppression, according to an example embodiment.

FIG. 4 is a flow chart illustrating a method 400 for utilizing digital microphones for low power keyword detection and noise suppression, according to an example embodiment. In block 402, the example method 400 can commence with receiving an acoustic signal representing at least one sound captured by a digital microphone. The acoustic signal may include buffered data transmitted on a single channel with a first (low) clock frequency. In block 404, the example method 400 can proceed with receiving at least one second acoustic signal representing the at least one sound captured by at least one second microphone. In various embodiments, the at least one second acoustic signal includes real-time data.

In block 406, the buffered data can be analyzed to determine that the buffered data includes a voice. In block 408, the example method 400 can proceed with sending the buffered data with a second clock frequency to eliminate a delay of the acoustic signal from the second acoustic signal. The second clock frequency is higher than the first clock frequency. In block 410, the example method 400, may delay the second acoustic signal by a pre-determined time period. Block 410 may be performed instead of block 408 for eliminating the delay. In block 412, the example method 400 can proceed with providing the first acoustic signal and the at least one second acoustic signal to an audio processing system. The audio processing system may include noise suppression and keyword detection.

Figure 5:
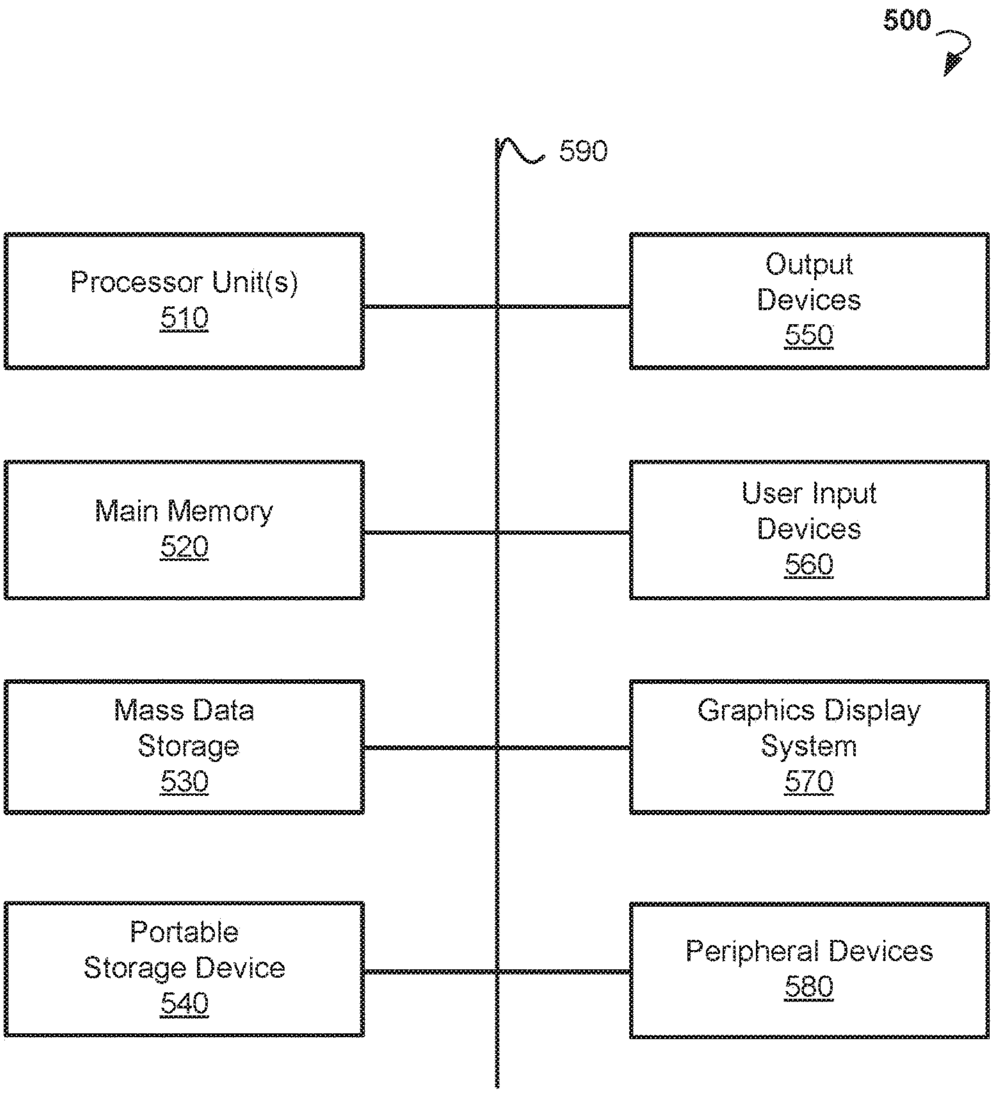
FIG. 5 is an example computer system that may be used to implement embodiments of the disclosed technology.

FIG. 5 illustrates an exemplary computer system 500 that may be used to implement some embodiments of the present invention. The computer system 500 of FIG. 5 may be implemented in the contexts of the likes of computing systems, networks, servers, or combinations thereof. The computer system 500 of FIG. 5 includes one or more processor units 510 and main memory 520. Main memory 520 stores, in part, instructions and data for execution by processor unit(s) 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit(s) 510 and main memory 520 is connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

The invention claimed is:

1. An audio processor comprising:

a processor; and memory communicatively coupled with the processor, the memory storing instructions which, when executed by the processor, configure the processor to:

receive a first signal representing at least one sound captured by a digital microphone, the first signal including buffered data;

receive at least one second signal representing the at least one sound captured by at least one second microphone, the at least one second signal including real-time data, the at least one second microphone being the digital microphone or a different microphone;

the buffered data delayed relative to the real-time data; and process the first signal and the at least one second signal.

2. The processor of claim 1, wherein the at least one second microphone is the digital microphone, and wherein the instructions, when executed by the processor, configure the processor to prepend the buffered data to the real time data.

3. The processor of claim 2, wherein the first signal includes the buffered data received on a first channel and real time data received from the digital microphone on a second channel.

4. The processor of claim 2, wherein the instructions, when executed by the processor, configure the processor to perform noise suppression or word detection on the first signal and the at least one second signal after prepending.

5. The processor of claim 2, wherein the instructions, when executed by the processor, configure the processor to provide a clock signal in response to receiving an indication that voice activity has been detected by the digital microphone, wherein at least the real time data is received at a clock frequency of the clock signal provided by the processor.

6. The processor of claim 5, wherein the instructions, when executed by the processor, configure the processor to convert a sample rate of the buffered data to a sample rate corresponding to the clock signal provided by the processor.

7. The processor of claim 1, wherein the instructions, when executed by the processor, configure the processor to provide a clock signal to the digital microphone after receiving an indication that voice activity has been detected by the digital microphone, wherein at least the buffered data is sampled at a frequency less than a frequency of the clock signal provided by the processor and the buffered data is received at the frequency of the clock signal provided by the processor.

8. The processor of claim 1, wherein the instructions, when executed by the processor, configure the processor to reduce latency between the first signal and the at least one second signal by delaying at least the first signal or the at least one second signal before processing.

9. A method in an audio processor, the method comprising:

receiving, at the audio processor, a first signal representing at least one sound captured by a digital microphone, the first signal including buffered data;

receiving, at the audio processor, at least one second signal representing the at least one sound captured by at least one second microphone, the at least one second signal including real-time data, the at least one second microphone being the digital microphone or a different microphone;

the buffered data delayed relative to the real-time data; and processing the first signal and the at least one second signal at the audio processor.

10. The method of claim 9, wherein processing the first signal and the at least one second signal at the audio processor includes prepending the buffered data to the real time data.

11. The method of claim 10, wherein receiving the first signal includes receiving the buffered data from the digital microphone on a first channel and receiving real time data from the digital microphone on a second channel.

12. The method of claim 10, wherein processing includes performing noise suppression or key word detection on the first signal and the at least one second signal at the audio processor.

13. The method of claim 10 further comprising:

receiving, at the audio processor, an indication that voice activity has been detected by the digital microphone;

providing a clock signal from the audio processor after receiving the indication, wherein at least the real time data from the digital microphone is received at a clock frequency of the clock signal provided by the audio processor.

14. The method of claim 13 further comprising converting the buffered data received from the digital microphone to a sample rate of the clock signal provided by the audio processor.

15. The method of claim 9 further comprising:

receiving, at the audio processor, an indication that voice activity has been detected by the digital microphone;

providing a clock signal from the audio processor to the digital microphone after receiving the indication, wherein at least the buffered data received from the digital microphone is sampled at a frequency less than a frequency of the clock signal provided by the audio processor and the buffered data is transmitted at the frequency of the clock signal provided by the audio processor.

16. The method of claim 9 further comprising reducing latency between the first signal and the at least one second signal by delaying at least one of the first signal and the at least one second signal before processing.

17. An audio processing system comprising:

a digital microphone having a buffer and an internal clock, the digital microphone configured to capture sound and buffer data representative of the captured sound using the internal clock, and to transmit a first signal including the buffered data;

a second microphone configured to capture the sound and transmit a second signal representative of the captured sound, the second signal including real time data, the buffered data delayed relative to the real-time data;

a processor communicatively coupled to memory storing instructions which, when executed by the processor, configure the processor to:

receive the first signal and the second signal;

prepend the buffered data to the real time data.

18. The system of claim 17, wherein the instructions, when executed by the processor, configure the processor to perform noise suppression or word detection on the first signal and the second signal.

19. The system of claim 17, the first signal including real time data, the digital microphone configured to transmit the buffered data on a first channel and the real time data on a second channel.

20. The system of claim 17, wherein the instructions, when executed by the processor, configure the processor to provide a clock signal to the digital microphone after receiving an indication that voice activity has been detected by the digital microphone, wherein at least the buffered data received from the digital microphone is sampled at a frequency less than a frequency of the clock signal provided by the audio processor and wherein the digital microphone transmits the buffered data at the frequency of the clock signal provided by the processor.

* * * * *